UNITED STATES PATENT OFFICE.

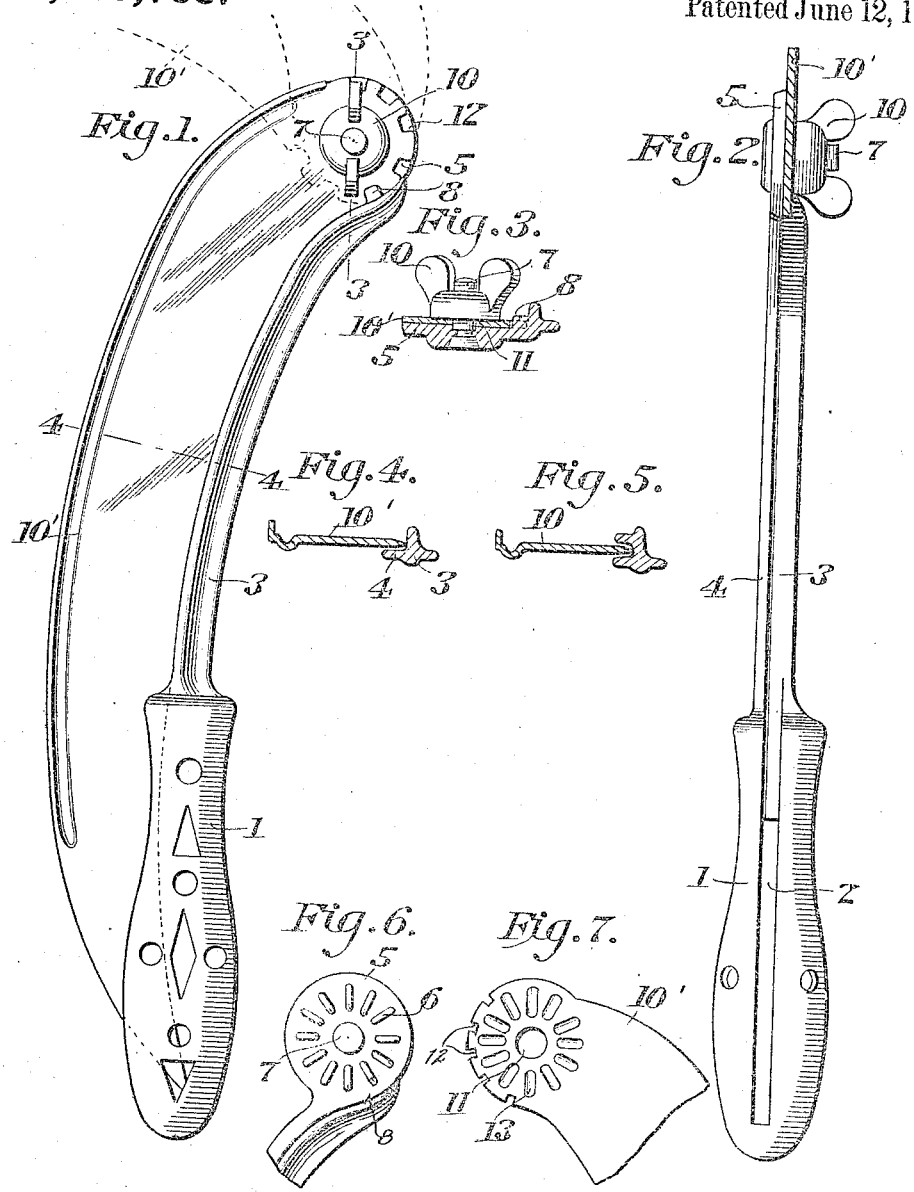

AARON FRENCH RAMSEY, OF AURORA, ILLINOIS.

GARDEN IMPLEMENT.

1,229,788. Specification of Letters Patent. Patented June 12, 1917.

Application filed October 8, 1915. Serial No. 54,799.

*To all whom it may concern:*

Be it known that I, AARON FRENCH RAMSEY, a citizen of the United States, residing at Aurora, in the county of Kane and State of Illinois, have invented new and useful Improvements in Garden Implements, of which the following is a specification.

This invention relates to garden implements and it consists in the novel features hereinafter described and claimed.

An object of the invention is to provide an implement of simple and durable structure which can be readily transformed from a grass hook to a corn knife, a corn hook, beet topper, branch cutter or pruner, and hedge knife.

With this object in view the implement comprises a handle having a shank joined therewith, and provided along its length with an outstanding rib; the handle is provided with a longitudinally disposed slot, one edge of which is located in alinement with one side of the said rib. A head is carried at the end of the shank and is provided at its face with a series of radially disposed corrugations and intervening depressions which are adapted to engage similar corrugations and depressions carried at the side of the blade which is mounted at the head of the shank. The blade is provided at its end which is joined with the head with a series of notches located at its peripheral portions any one of which is adapted to receive a lug mounted at the edge portion of the head. A clamping bolt passes transversely through the blade and the head and a wing nut is screwed thereon whereby the blade is held at adjusted position with relation to the head. When the device is not in use as a garden implement, the blade may be swung so that its pointed end may enter the slot provided in the handle whereby the point is protected and the cutting edge portion of the blade may lie along the said rib thereby making it possible to handle or transport the implement without danger of one cutting the hands by bringing the same in contact with the point or cutting edge of the blade.

In the accompanying drawing;—

Figure 1 is a side elevation of the implement.

Fig. 2 is an edge elevation of the same with part in section.

Fig. 3 is a detailed sectional view of the same cut on the line 3—3 of Fig. 1.

Fig. 4 is a similar view cut on the line 4—4 of Fig. 1.

Fig. 5 is a detailed transverse sectional view of the same showing a slight modification.

Fig. 6 is a plan view of the end portion of the shank of the implement.

Fig. 7 is a plan view of the end portion of the blade of the implement.

The garden implement includes a handle 1 which is preferably of cast metal and is formed hollow. The said handle is provided at its side with a longitudinally disposed slot 2. A metallic shank 3 is integrally joined with one end of the handle and the said shank is curved longitudinally as best shown in Fig. 1 of the drawing. The shank 3 is provided at one side with an outstanding rib 4 which extends the full length of the shank and joins with the handle 1 and one side of the rib 4 is in alinement with one of the side walls of the slot 2 which is provided in the handle 1. A circular head 5 is integrally joined with the outer end portion of the shank 3 and is disposed beyond one side of the said shank. The head 5 is provided at one face with a series of radially disposed corrugations 6 which are separated from each other by means of intervening depressions. A stud or bolt 7 is mounted at the center of the head 5 and a lug 8 is formed upon the shank 3 in the vicinity of the edge of the head 5. A wing nut 10 is screwthreaded upon the stud 7.

A blade 10 of any desired form or pattern may be used in conjunction with the structures hereinbefore described and in the former blade as shown in Fig. 1 the said blade is especially adapted to be used as a grass hook. The blade 10 is provided at one end with an opening 11 adapted to receive the stud 7 and the blade is provided at its edge with notches 12, any one of which may receive the lug 8 whereby the blade is held at an adjusted position with relation to the shank and the wing nut 9 is tightened upon the stud 7. It is apparent that the blade may be disposed at any desired position with relation to the shank and the blade is provided at its end and at one side with a series of radially disposed corrugations 13 spaced from each other by means of intervening depressions. When the blade is assembled upon the hook 5 the corrugations 13 at the side of the blade engage the corrugation 6 upon the head whereby the parts are securely held at the position to which they are adjusted. When the blade 10 is not in use it may be folded along the shank 3 so that its cutting edge will lie along the rib 4 and the pointed end of the blade may enter the slot 2 provided in the handle 1. Thus when the device is not in use the blade may be folded and its cutting edge and point sheathed in a manner to prevent the possibility of the said edge or point cutting or injuring a person handling the implement.

From the above description taken in conjunction with the accompanying drawing it will be seen that a garden implement of simple and durable structure is provided and that the same by the application of blades of different forms or patterns may be transformed from an implement of one character to an implement of another, and consequently it is susceptible of a vast variety of uses in garden, orchards, or similar places where such an implement would find convenient use.

Having described the invention what is claimed is:—

An implement comprising a shank having a rib extending longitudinally thereof, a stud mounted on the shank beyond one side of the rib, a nut screwthreaded upon the stud, a blade pivoted on the stud and provided with notches located at its edge adjacent the rib, there being provided upon the shank and blade and around the stud inter-engaging corrugations, there being further provided upon the shank and adjoining the side of the rib a lug adapted to enter one of the notches of the blade, said lug being located beyond the outer ends of the said corrugations.

In testimony whereof I affix my signature in presence of two witnesses.

AARON FRENCH RAMSEY.

Witnesses:
 H. A. DOTTERWICH,
 AUGUST BAUMAN.

Copies of this patent may be obtained for five cents each, by addressing the "Commissioner of Patents, Washington, D. C."